United States Patent

[11] 3,545,635

| [72] | Inventor | Carl S. Montan |
| | | 18806 E. Vino Ave., Reedley, California 93654 |
| [21] | Appl. No. | 749,114 |
| [22] | Filed | July 31, 1968 |
| [45] | Patented | Dec. 8, 1970 |

[54] PRELOAD FOR HAULING LOGS AND THE LIKE
9 Claims, 6 Drawing Figs.

[52] U.S. Cl............................................. 214/515, 280/425, 280/434
[51] Int. Cl............................................. B60p 1/64
[50] Field of Search............................................. 214/515; 280/423, 425, 434, 402; 254/86(H), 86

[56] References Cited
UNITED STATES PATENTS
1,654,503  12/1927  Jones............................ 280/423
3,261,488  7/1966  Van Raden.................... 214/515
3,439,934  4/1969  Murie, Jr. et al............... 214/575

*Primary Examiner*—Albert J. Makay
*Attorney*—Huebner and Worrel

ABSTRACT: A preload adapted independently to support loads of logs and the like and supportably to connect such loads to a prime mover having an elongated frame mounting a fifth wheel providing a plurality of legs elevationally positionable between a lowered load supporting position permitting such a truck frame to be maneuvered beneath the preload and a raised transport position on the truck frame and connecter means on the preload engageable with said fifth wheel automatically to effect a load supporting draft connection therebetween and to permit raising of the legs to their transport positions.

PATENTED DEC 8 1970

CARL S. MONTAN
INVENTOR

Huebner & Worrel
ATTORNEYS

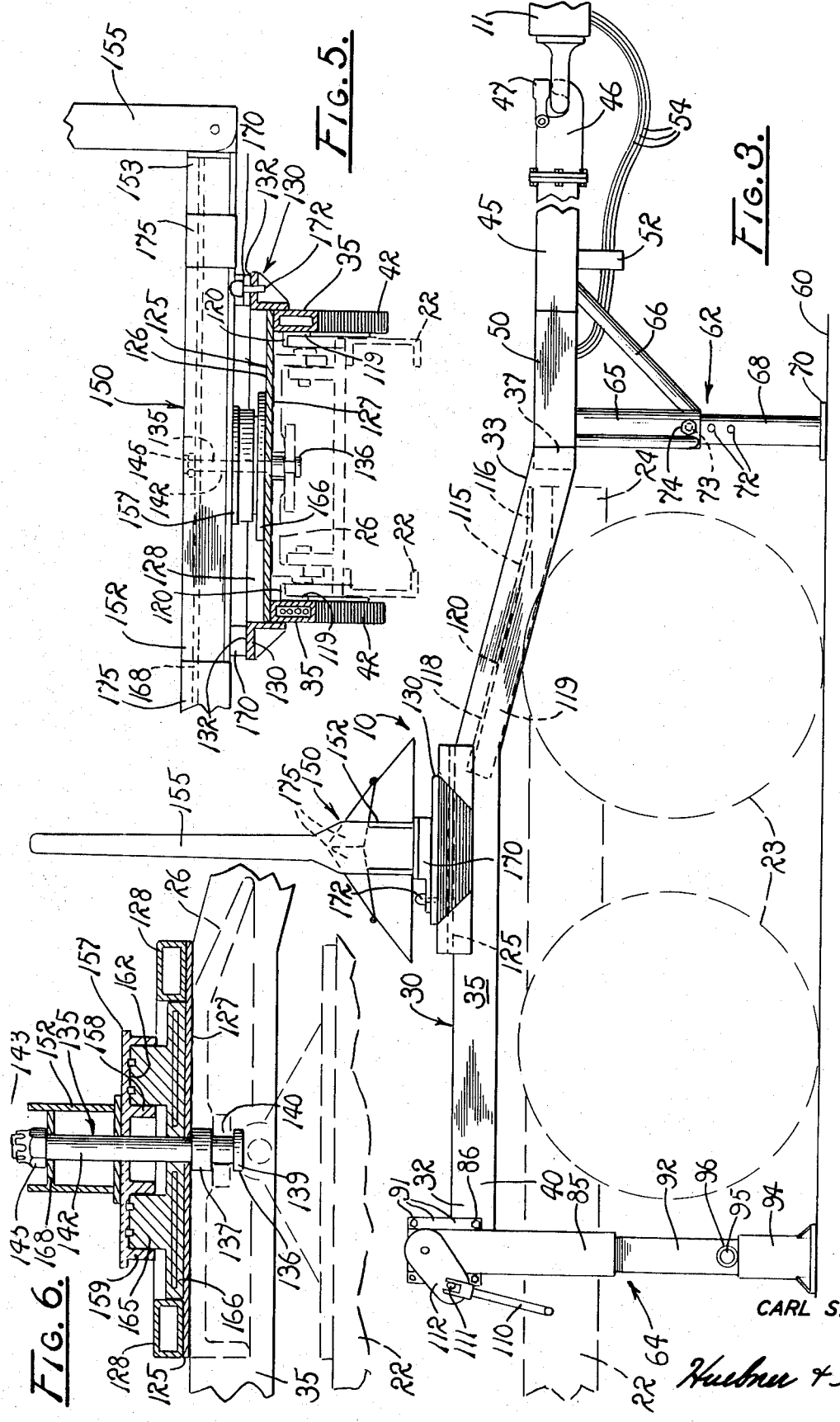

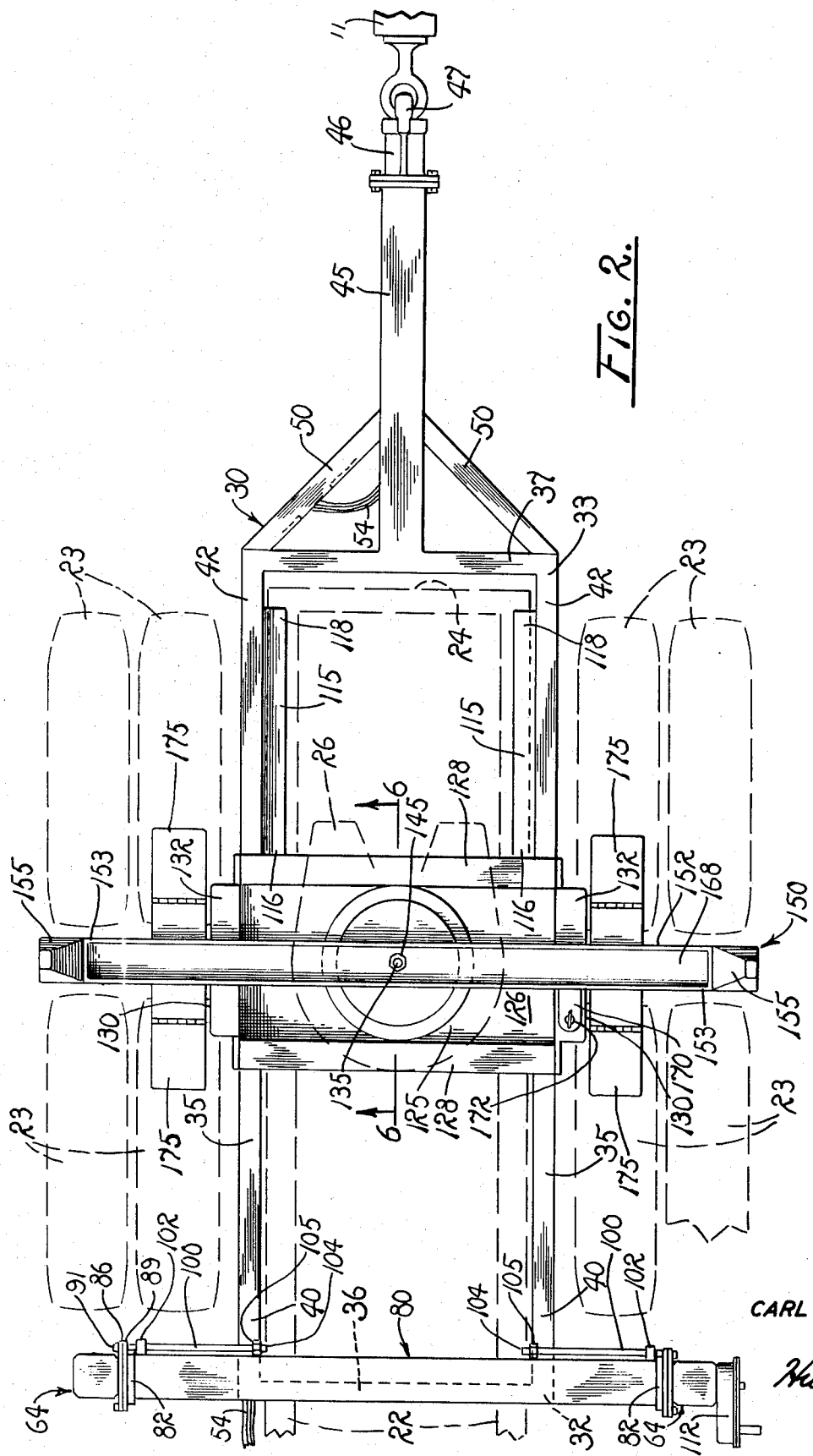

PRELOAD FOR HAULING LOGS AND THE LIKE

BACKGROUND OF THE INVENTION

The use of preloads in the logging industry is well known. Conventional preloads usually provide a generally rectangular frame which is elevationally supported on a plurality of legs so that the preload is capable of independently supporting the forward end of a load of logs with the rearward end of the load being supported on a reach-type logging trailer. Several types of load constraining bunks are interchangeably pivotally mounted on the preload and logging trailer to accommodate a particular type load. In logging operations, loads of logs are built up in the woods at a tree falling and loading site by stacking the logs upon sets of preloads and trailers during the absence of their prime movers which are involved in the transportation and deposit of previously constructed loads at a holding area near a highway or at an unloading site such as a sawmill or the like. This constitutes a substantial savings of time since the prime movers are not compelled to stand idle during the loading and unloading operations. Upon the return of the prime movers to the log loading site, they are immediately backed under another preload without any unnecessary delay. The prime movers employed in such logging operations have a specially constructed truck frame with the usual fifth wheel trailer connection removed to accommodate the particular configuration of the preload frame. The presently available commercial preloads are limited for use with a corresponding truck frame and are not usually interchangeable. One such conventional truck frame and preload employs a plurality of hydraulic jacks which are carried on the truck frame for engaging the preload to raise it sufficiently to permit the support legs to be swung to a transport position. The preload is deposited at the load holding or unloading area by extending the jacks to permit the legs to be swung downwardly and extended into their load supporting positions so as to free the truck frame from the load. If the load is to be left at the load holding area, the prime mover merely returns empty to acquire another load at the loading area. If, on the other hand, the load is deposited at the log unloading area, there is usually at least one logging trailer and preload which have been previously unloaded. The empty trailer is hoisted onto the preload and the truck frame backed thereunder in supporting relation for transport back to the loading area. While the efficiency of such preload logging operation is unquestionably apparent, one major disadvantage exists. The conventional preloads require specially constructed truck frames which eliminate the usual fifth wheel normally employed for connecting the prime mover to other types of trailers. Accordingly, such logging trucks are not adapted for any other type of hauling operation without extensive modification which involves the replacement of the special preload accommodating frame for the usual fifth wheel arrangement. Without the fifth wheel, such conventional preloads require the described hydraulic lifting system which substantially increases the initial cost and subsequent maintenance expense of the preload.

SUMMARY OF THE INVENTION

Accordingly, it is an object of the present invention to provide an improved preload for hauling logs and the like without the expensive hydraulic systems used on conventional preloads.

Another object is to provide such an improved preload which requires no modification of the conventional truck frames on existing prime movers.

Another object is to provide an improved preload which is adapted to accommodate the usual fifth wheel on the truck frame of conventional prime movers so that the prime movers are not restricted to exclusive use as a logging truck.

Another object is to provide an improved preload which utilizes a kingpin automatically receivable within the locking portion of the fifth wheel to afford a dependable draft connection between the preload and the prime mover.

Another object is to provide an improved preload in which the kingpin is capable of serving the dual function of pivotally mounting load constraining bunks on the preload as well as establishing the draft connection.

Other objects and advantages of the present invention will subsequently become more clearly apparent upon reference to the following description and accompanying drawings.

BRIEF DESCRIPTION OF THE DRAWINGS

FIG. 2 is a somewhat enlarged top plan view of the preload supported on the truck frame of the prime mover which is shown in dashed lines with the legs of the preload inwardly extended to their transport positions.

FIG. 3 is a somewhat enlarged side elevation of the preload in its independent load supporting condition with the truck frame shown in dashed lines disposed beneath the preload for effecting a draft connection therebetween.

FIG. 5 is a somewhat enlarged transverse vertical section through a combined kingpin and bunk mounting shaft with the fifth wheel of the truck frame shown in dashed lines in connecting relation to the kingpin.

FIG. 6 is a somewhat enlarged longitudinal vertical section through the kingpin and bunk mounting shaft, taken on line 6–6 of FIG. 2.

DESCRIPTION OF THE PREFERRED EMBODIMENT

Figure 1:
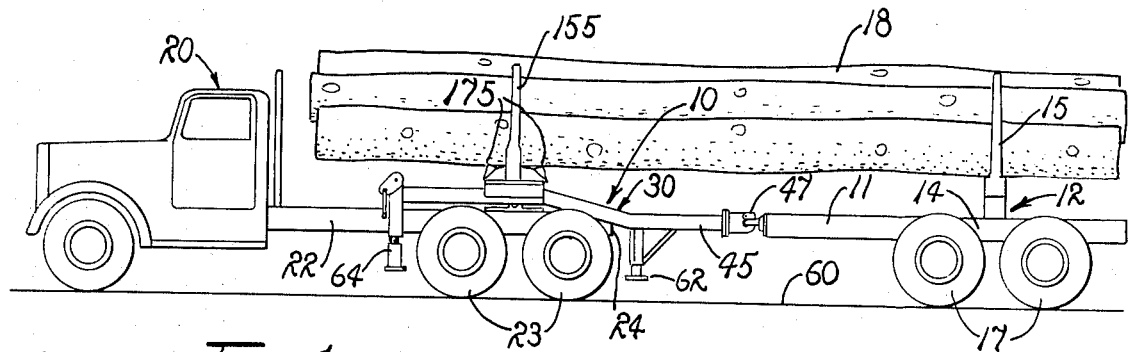
FIG. 1 is a side elevation of a preload embodying the principles of the present invention disposed in a load supporting condition connected to a logging trailer and with the truck frame of a prime mover disposed beneath the preload for effecting a draft connection therebetween.

Referring more particularly to the drawings, a preload embodying the principles of the present invention is generally indicated by the reference numeral 10 shown in FIG. 1 pivotally connected to the reach 11 of a logging trailer 12. The trailer includes a rearward frame 14 which pivotally mounts an upwardly extended load constraining bunk 15 and sets of ground engaging tandem support wheels 17. The preload is adapted to support the forward end of a load of logs 18 or the like with the trailer supporting the rearward end thereof. The preload is also adapted to be associated with a prime mover 20 having a rearwardly extended truck frame 22 supported by sets of tandem drive wheels 23. The truck frame has a rearward end 24 and a conventional fifth wheel 26 is mounted on the frame substantially midway between the tandem drive wheels.

As best shown in FIGS. 2 and 3, the preload 10 of the present invention provides an elongated substantially rectangular frame 30 having predetermined opposite forward and rearward ends 32 and 33, respectively. The frame is constructed of a plurality of elongated hollow box section beams weldably interconnected in substantially rigid unitary construction. The frame includes oppositely spaced substantially parallel side beams 35 rigidly interconnected at the forward and rearward ends of the frame by a forward beam 36 and a rearward beam 37. As best shown in FIG. 3, the side beams include forward portions 40 disposed in a predetermined substantially horizontal plane spaced above the rearward end 32 of the frame and rearward portions 42 angularly downwardly extended therefrom for connection to the rear beam 37. A stinger beam 45 is connected to the rear beam 37 substantially intermediate the side beams 35 and is rearwardly extended therefrom substantially coextensively with the longitudinal center line of the frame. The stinger beam terminates in a rearward end 46 having a coupling 47 providing a pivotal connection for the forward end of the reach 11 of the logging trailer 12.

A pair of hollow frame bracing beams 50 are individually weldably connected to the rearward ends of the side beams 35 in rearwardly converging relation against opposite sides of the stinger beam 45 in rearwardly spaced relation from the rear beam 37. A control conduit connecter block 52 is mounted in depending relation from the stinger beam 45 for supporting a plurality of elongated flexible control conduits 54. The conduits are extended from the usual pneumatic and electrical mechanisms, not shown, on the trailer 12 for extension through one of the bracing beams 50, as shown in FIG. 2, and through the associated hollow side beam 35 and outwardly of the forward end thereof for connection to the prime mover.

The frame 30 is supported in elevationally spaced relation to a ground surface 60 by a plurality of elevationally retractable legs which include a single rear leg 62 and a pair of laterally spaced forward legs 64. The rear leg provides an upper sleeve portion 65 welded in depending relation from the stinger beam 45 rearwardly adjacent to the rear beam 37 of the frame. A brace 66 is angularly upwardly rearwardly extended from the lower end of the sleeve for connection to the stinger in rearwardly spaced relation to the sleeve. The rear leg includes a lower portion 68 which is telescopically slidably upwardly extended into the sleeve 65 and has a lower foot 70 constructed of a substantially square flat plate for engagement with the ground surface 60. A plurality of longitudinally spaced leg adjusting holes 72 are formed through the upper end of the lower portion 68 of the rear leg for selective alinement with a bore 73 through the lower end of the sleeve 65 to receive a locking bolt 74 therethrough to hold the leg in a plurality of extended and retracted positions.

The forward legs 64 are mounted on an elongated hollow box section crosshead beam 80 having opposite opened flanged ends 82 outwardly spaced from their respectively associated side beams 35 of the frame and in overlying relation to the forward beam 36. Gusset plates 83 are disposed in interconnecting strengthening relation beneath the extended ends of the crosshead beam and the side beams 35. The forward legs 64 include upper sleeve portions 85 having an upper inwardly disposed mounting plate 86 connected thereto. An elongated leg mounting arm 88 is telescopically slidably mounted within each end of the crosshead beam 80 and has an outer mounting plate 89 corresponding to the mounting plate 86 for facing engagement therewith in rigidly connected relation by a plurality of bolt and nut assemblies 91. The forward legs 64 further individually include lower portions 92 which are elevationally telescopically mounted within their respective sleeves 85 for movement between lower load supporting positions and upwardly retracted transport positions. A foot member 94 is pivotally mounted on each of the lower ends of the lower portions 92 of the legs by an ankle pin 95 extended through a pair of ears 96 on the foot member disposed in embracing relation to the lower end of its leg.

Figure 4:
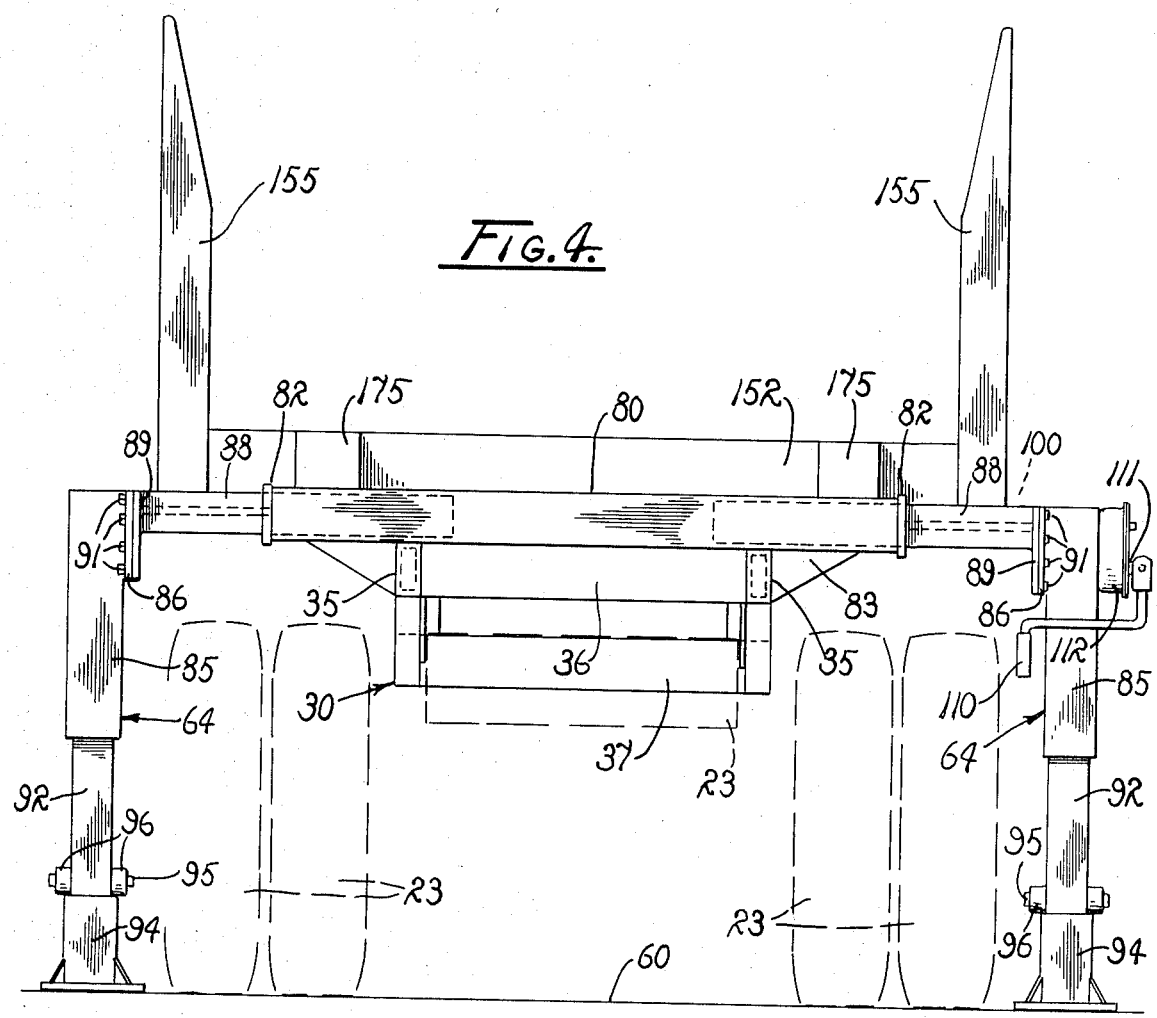
FIG. 4 is a front elevation of the preload with the legs extended in their load supporting positions to accommodate maneuvering of the truck frame therebetween to its connecting position beneath the preload.

An elongated stop rod 100 is rigidly mounted on the mounting plate 89 of each of the arms 88 in inwardly extended relation along the rearward surface of the crosshead beam 80. The stop rod is extended through a boss 102 on the rearward surface of the crosshead beam closely adjacent to the flanged end thereof and has a screw-threaded distal end 104 adjustably mounting a stop nut 105 for engagement with the boss to limit outward sliding movement of its respective arm and forward leg to the load supporting position shown in FIG. 4. A crank arm 110 is pivotally mounted on a drive shaft 111 extended from a reduction gear box 112 providing controlling connection to the lower portion 92 of both forward legs 64 for simultaneous elevational adjustment to raise and lower the preload frame 30.

A pair of elongated truck frame guide rails 115 are mounted in spaced substantially parallel relation individually on the inner surfaces of the rearward portions 42 of the side beams 35. The guide rails include rearward substantially horizontal portions 116 and forwardly upwardly inclined ramp portions 118. As best shown in FIG. 5, the rails are constructed of angle iron and include substantially vertical mounting legs 119 and right angularly disposed supporting rail portions 120.

An elongated substantially flat rectangular slide plate 125 is disposed in bridging relation upon the side beams 35 forwardly adjacent to the rearward portions 42 thereof. The slide plate includes opposite upper and lower surfaces 126 and 127, respectively, with the lower surface being adapted slidably to engage the upper surface of the fifth wheel 26 on the frame 22 of the prime mover 20. A pair of hollow box section strengthening beams 128 are individually mounted upon the upper surface 126 of the slide plate coextensively along the forward and rearward edges thereof in substantially parallel relation to each other. A pair of outrigger arms 130, constructed of elongated angle irons, provide substantially upright side portions rigidly secured to the outer sides of the side beams, as by welding or the like, in covering relation to the ends of the slide plate and the ends of the strengthening beams 128. The outrigger arms include upper substantially horizontal slide surfaces 132 for a purpose hereinafter to be described.

An elongated preload connecter shaft 135 is disposed in substantially upright position centrally of the slide plate 125. The connecter shaft includes a lower kingpin end 136 having an annular flange 137 intimately disposed in facing engagement with the lower surface 127 of the slide plate. The kingpin end of the shaft further includes an endwardly disposed flange 139 in spaced relation to the flange 137 with which it defines an annular groove 140 adapted to be releasably engaged in clamping relation by the usual locking jaws of the fifth wheel 26. The connecter shaft further includes an upper pivot post portion 142 having a screw-threaded upper end 143 adapted screw-threadably to mount a locknut 145 thereon.

A load constraining bunk 150 is pivotally mounted on the pivot post 142 for limited swinging movement relative to the preload frame 30. The bunk provides an elongated crossbeam 152 having outer ends 153 disposed in laterally outwardly overhanging relation to the frame 30 which mount a pair of substantially upstanding stakes 155. The crossbeam has a circular mounting cup 157 disposed in depending relation intermediate its ends. The cup includes a pair of annular depending concentrically spaced flanges 158 and 159 which form an annular track 162 therebetween. The track is adapted to receive an annular ring 165 which is mounted on a circular scale plate 166 welded to the upper surface 126 of the slide plate 125 between the strengthening beams 128 and the outrigger arms 130. A weight sensing mechanism, not shown, may be connected to the scale plate 166 in the usual manner and forms no part of the present invention.

As best shown in FIG. 6, the upper pivot post portion 142 of the connecter shaft 135 is extended through alined bores in the scale plate 166, cup 157, ring 165, and crossbeam 152. The upper screw-threaded end of the pivot post is extended through an upper plate 168 on the crossbeam against which the locknut 145 is tightened to maintain the described components of the bunk in assembly. A pair of foot pads 170 are mounted in substantially horizontal depending relation from the crossbeam 152 in sliding supporting engagement with the upper surface 132 of the outrigger arms 130. A lockpin 172 is carried on one of the foot pads for extension through an alined bore in its associated outrigger arm when it is desired to lock the bunk against rotation. A pair of tire wedging blocks of triangular box construction are pivotally mounted on the crossbeam 152 of the bunk for movement between downwardly spaced retracted load hauling positions, as shown in FIG. 1, and upwardly extended positions for extension into the space between the adjacent sets of tandem wheels 17 on the trailer 12 for transporting the same in an empty condition.

OPERATION

The operation of the described embodiment of the subject invention is believed to be clearly apparent and is briefly summarized at this point. Assuming that the preload 10 of the present invention is independently standing in an empty condition, the stringer 45 is connected by the coupling 47 to the forwardly extended reach 11 of the logging trailer 12. The frame 30 is disposed in an elevated position from the ground surface 60 by the forward and rearward legs 64 and 62 with the forward legs laterally outwardly extended to their load supporting positions of FIG. 4. The control conduits 54 of the trailer are connected to the coupling block 52 in operating relation to the portions thereof extending through the side beams 35 and the rearward bracing beam 50 of the frame. It will be noted that the tire wedging blocks 175 are disposed in their retracted lower positions. The load of logs 18 is deposited upon the bunks 15 and 150 with the preload supporting the forward end of the load and the trailer 12 supporting the rearward end thereof.

When it is desired to transport the load of logs 18, the prime mover 20 is maneuvered and backed rearwardly beneath the frame 30 of the preload 10. As noted in FIG. 4, the rear wheels 23 are received between the outwardly extended forward legs 64 so as to aline the rearward end 24 of the truck frame precisely between the rearward downwardly inclined portions 42 of the side beams 35, as shown in FIG. 2. If the rear leg 62 should be disposed in a depression in the ground surface 60, the rearward end of the truck frame first engages the forward ramp portion 118 of the guide rails 115. Accordingly, during continued rearward movement of the truck frame relative to the preload frame 30, the rearward end 33 of the preload frame is elevated until the rearward end of the truck frame slides under the rearward horizontal portions 116 of the guide rails. This, of course, relieves the weight of the load from the rear leg 62 and enables it to be manually telescoped upwardly within its mounting sleeve 65 to a transport position. This is accomplished by removing the lock bolt 74 and reinserting it through the lowermost hole 72 in the lower portion of the leg. It is noted that upon raising of the rearward end of the frame, the frame is prevented any rearward skidding movement by the weight of the load imposed against the forward legs 64 and the normally locked brakes on the trailer.

During the above described maneuvering of the truck frame beneath the preload frame 30, the fifth wheel 26 slidably engages the lower surface 127 of the slide plate 125 with the previously described guide rails 115. This insures that the lower kingpin end 136 of the connecter shaft 135 is precisely alined and releasably secured within the locking jaws of the fifth wheel. Upon the completion of such draft connection, the lower ends 92 of the forward legs 64 are raised by manipulation of the crank 110 to the elevated transport position shown in FIG. 1. For optimum stability, it will be noted that the bunk pivot post 142 is disposed in substantially centered relation between the tandem wheels 23 of the truck frame. It will also be noted that the forwardmost of the wheels 23 are disposed rearwardly of the crosshead 80 to permit inward telescoping movement of the leg mounting arms 88 inwardly of the crosshead beam 80 to the retracted transport position shown in FIG. 2. The load of logs 18 may then be transported by the prime mover to the unloading area or load holding area, as may be desired.

Upon reaching the unloading area, the front and rear legs 64 and 62 are dropped downwardly into their ground engaging load supporting positions by simply reversing the elevating operation previously described. The crank 110 may be further manipulated in order to raise the preload frame 30 a slight amount sufficient to relieve the load from the truck frame 22 of prime mover 20 to permit its unrestricted outward movement therefrom. The prime mover may then be backed under a previously unloaded preload having an empty trailer 12 mounted thereon for transport back to the loading site. In order to accommodate the empty trailer, the preload is easily converted simply by pivoting the tire wedging blocks 175 to their upwardly extended positions of FIG. 3 for extension between the set of dual wheels 17 of the trailer. In such position, the forwardly extended reach portion 11 of the trailer is extended over the cab portion of the prime mover and the lockpin 172 is installed through the foot pad 170 and associated outrigger arm 130 to preclude relative rotation of the bunk 150 with respect to the preload frame 30. The truck frame 22 is then backed under the preload frame and the draft connection between the kingpin 136 and the fifth wheel 26 effected in the same manner as previously described. In this instance, however, the trailer 12 cannot be used to brake the vehicle to preclude rearward skidding movement of the preload. Such skidding movement, however, is resisted by the weight of the preload frame and trailer imposed against the forward legs 64.

In view of the foregoing, it is readily apparent that the structure of the present invention provides an improved preload which affords a dependable draft connection utilizing the conventional fifth wheel of the prime mover without any modification of the truck frame of the prime mover. Each of the loading or unloading operations can be accomplished in a matter of a few minutes by a single workman or driver of the prime mover. The structure of the present invention is much simpler but vastly superior to the conventional preload structures and less costly to manufacture, particularly in view of the complete elimination of any hydraulic lifting jacks, as required by such conventional preloads.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

I claim:

1. A preload adapted independently to support loads and supportably to connect such loads to a prime mover having an elongated truck frame mounting a fifth wheel comprising a load support frame providing predetermined forward and rearward ends having a plurality of legs elevationally positionable between a lowered load supporting position permitting the truck frame to be maneuvered beneath the support frame, and a raised transport position with the preload disposed entirely upon the truck frame; connecter means adjacent to the forward end of said support frame engageable with said fifth wheel automatically to effect a load supporting draft connection therebetween; said support frame includes opposed portions embraceably with said truck frame precisely longitudinally to aline them during said maneuvering of the truck frame beneath the support frame and to preclude lateral shifting and pivoting movement of the support frame relative to said truck frame when disposed in its supported position thereon; and guide means at said rearward end of the support frame being concurrently slidably engageable with said truck frame automatically supportably to relieve the weight of said support frame from said legs during said maneuvering of the truck frame beneath the preload whereby the entire support frame is elevated to a supported position upon the truck frame to permit raising of the legs to their transport positions.

2. The preload of claim 1 in which said truck frame has a rearward end, said support frame includes spaced substantially parallel sides having opposite forward and rearward ends with said forward end disposed in a substantially horizontal plane above said truck frame and said rearward end is disposed in substantially coplanar rearwardly spaced relation to said rearward end of the truck frame, and an intermediate forwardly upwardly inclined portion interconnecting said forward and rearward ends of said sides of the support frame in laterally embracing relation to said rearward end of the truck frame.

3. The preload of claim 2 wherein said guide means is mounted on said sides of the support frame inwardly of said intermediate portion thereof slidably to engage said rearwardly extended portion of the truck frame.

4. The preload of claim 3 wherein said guide means comprises a pair of elongated guide rails individually inwardly mounted on said sides of the support frame in spaced substantially parallel relation and having substantially horizontal rearward ends and opposite upwardly inclined forward ends providing ramps for initially slidably engaging said rearward end of the truck frame as it is maneuvered beneath the support frame whereby the rearward end of the support frame is elevated to a supported position upon the truck frame.

5. The preload of claim 4 in which said legs are arranged in triangular relation on said support frame including a single rear leg at said rearward end thereof and a pair of forward legs at said forward end of the support frame, means individually mounting said forward legs in laterally spaced relation at said sides of the support frame for lateral movement between outwardly spread loading positions permitting movement of the rearward end of the truck frame therebetween and inwardly disposed transport positions, and powered means interconnecting said forward legs for manipulating them between their raised and lowered positions.

6. A preload, adapted to support loads and supportably to connect such loads to a prime mover having an elongated frame providing a rearward end mounting a fifth wheel, comprising a support frame having interconnected rectangularly arranged opposite side and forward and rearward end beams; said side beams including spaced substantially parallel horizontal forward portions and truck frame guide portions angularly downwardly inclined therefrom toward said rearward end beam; a pair of elongated guide rails individually inwardly mounted on said guide portions of said side beams of the support frame and having rearward substantially horizontal portions and upwardly inclined forward ramp portions; an elongated trailer connecting stinger rearwardly extended from said rearward beam; a rear elevationally adjustable leg mounted in depending supporting relation from said stinger adjacent to said rearward beam; a pair of elevationally adjustable forward legs slidably mounted on the forward end beam individually adjacent to said side beams for lateral movement between outwardly spread loading positions permitting movement of the rearward end of the truck frame therebetween beneath the forward portions of the side beams and between said guide portions thereof and inwardly disposed transport positions when the preload is disposed on the truck frame; a substantially flat plate disposed in bridging relation to said side beams intermediate said forward and rearward end beams and having a lower surface slidably supportably engageable by said fifth wheel on the truck frame; and a kingpin mounted centrally upon said plate and having a lower end extended therefrom in depending relation for automatic connection to said fifth wheel upon completion of said maneuvering of the truck frame beneath the support frame.

7. The preload of claim 6 in which said kingpin has an opposite upper load bunk mounting end upwardly extended from the plate.

8. The preload of claim 7 including a pair of outrigger arms individually mounted on said side beams outwardly adjacent to said plate and providing upper bunk supporting slide surfaces spaced above the plate.

9. The preload of claim 8 in which said side beams and stinger are constructed of hollow box sections to accommodate the extension of trailer control elements therethrough for connection to the prime mover.